US009263903B2

(12) United States Patent
Newton

(10) Patent No.: US 9,263,903 B2
(45) Date of Patent: Feb. 16, 2016

(54) DETECTING AND SWITCHING BATTERY POLARITY IN A BATTERY CHARGER

(75) Inventor: James R. Newton, Burnsville, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 537 days.

(21) Appl. No.: 13/545,752

(22) Filed: Jul. 10, 2012

(65) Prior Publication Data

US 2013/0015824 A1    Jan. 17, 2013

Related U.S. Application Data

(60) Provisional application No. 61/506,307, filed on Jul. 11, 2011.

(51) Int. Cl.
*H02J 7/02* (2006.01)
*H02J 7/00* (2006.01)
*H04R 25/00* (2006.01)

(52) U.S. Cl.
CPC ............... *H02J 7/0034* (2013.01); *H04R 25/30* (2013.01)

(58) Field of Classification Search
CPC ............... H02J 7/02; G05F 1/10; H02H 3/18
USPC ........ 320/23, 25, 26, 103, 125, 165; 327/391, 327/543, 588; 361/56, 184, 86; 340/687; 362/183
See application file for complete search history.

(56) References Cited

U.S. PATENT DOCUMENTS

| | | | |
|---|---|---|---|
| 3,273,039 A | 9/1966 | Godshalk et al. | |
| 4,349,774 A | 9/1982 | Farque | |
| 4,663,579 A | 5/1987 | Yang | |
| 5,304,916 A * | 4/1994 | Le et al. | 320/131 |
| 5,541,495 A * | 7/1996 | Gali | 320/165 |
| 5,623,550 A | 4/1997 | Killion | |
| 5,795,182 A | 8/1998 | Jacob | |
| 5,833,493 A * | 11/1998 | Hung | 439/504 |
| 5,965,998 A * | 10/1999 | Whiting et al. | 320/165 |
| 6,130,519 A | 10/2000 | Whiting et al. | |
| 6,632,103 B1 | 10/2003 | Liu | |
| 6,646,845 B1 * | 11/2003 | Turner et al. | 361/86 |

(Continued)

FOREIGN PATENT DOCUMENTS

GB    2265267 A    9/1993

OTHER PUBLICATIONS

"European Application Serial No. 12175869.2, Extended European Search Report mailed Jun. 3, 2014", 6 pgs.

*Primary Examiner* — Richard Isla Rodas
*Assistant Examiner* — Dung V Bui
(74) *Attorney, Agent, or Firm* — Schwegman Lundberg & Woessner, P.A.

(57) ABSTRACT

Disclosed herein, among other things, are apparatus and methods for detecting and switching battery polarity in a battery charger. In various embodiments, a method includes grounding a first terminal of a battery inserted in a charger and sensing a bipolar voltage from a second terminal of the battery. The bipolar voltage is converted to a reduced unipolar voltage for sensing by an input to a microcontroller. A low resistance analog switch connects the battery to a charging circuit. The switch state of the analog switch is controlled using an output of the microcontroller, to present the proper battery polarity to the charging circuit based on the unipolar voltage. The battery is charged using the charging circuit, in various embodiments.

20 Claims, 6 Drawing Sheets

(56) References Cited

U.S. PATENT DOCUMENTS

| | | | |
|---|---|---|---|
| 6,967,463 B1* | 11/2005 | Gordon et al. | 320/103 |
| 7,508,167 B2* | 3/2009 | Meyer et al. | 320/125 |
| 7,841,735 B2* | 11/2010 | Newton et al. | 362/183 |
| 8,120,884 B2* | 2/2012 | Zhang | 361/56 |
| 2005/0035667 A1 | 2/2005 | Joannou | |
| 2005/0196003 A1 | 9/2005 | Fluit | |
| 2006/0055368 A1 | 3/2006 | Chang | |
| 2008/0169787 A1 | 7/2008 | Hsieh | |
| 2012/0206194 A1* | 8/2012 | Chen et al. | 327/543 |
| 2013/0015824 A1* | 1/2013 | Newton | 320/165 |

* cited by examiner

DETECTING AND SWITCHING BATTERY POLARITY IN A BATTERY CHARGER

RELATED APPLICATION

The present application claims the benefit under 35 U.S.C. 119(e) of U.S. Provisional Patent Application Ser. No. 61/506,307, filed Jul. 11, 2011, which is incorporated herein by reference in its entirety.

FIELD OF THE INVENTION

The present subject matter relates generally to battery chargers and in particular to detecting and switching battery polarity in a battery charger.

BACKGROUND

Some electronic devices use rechargeable batteries that require periodic charging to maintain proper device performance. Battery rechargers typically require a battery to be inserted into the recharger in a single specific physical orientation to provide the correct polarity for recharging the battery. Existing solutions rely on either mechanical features to restrict the user from inserting the battery the wrong way or visible markings to instruct the user on proper insertion. However, these solutions are troublesome in the case of relatively small battery cells. Mechanical features can be defeated by forceful insertion, which can prevent battery charging or even cause damage to the battery or charger. Visible markings are often difficult to see, particularly if small and not high in contrast, and are ineffective for people with visual impairments.

Accordingly, there is a need in the art for improved apparatus and methods for detecting and switching battery polarity in a battery charger.

SUMMARY

Disclosed herein, among other things, are apparatus and methods for detecting and automatically switching battery polarity in a battery charger. In various embodiments, a method includes grounding a first terminal of a battery inserted in a charger and sensing a bipolar voltage from a second terminal of the battery. The bipolar voltage is converted to a reduced unipolar voltage for sensing by an input to a microcontroller. A low resistance analog switch connects the battery to a charging circuit. The switch state of the analog switch is controlled using an output of the microcontroller, to present the proper battery polarity to the charging circuit based on the unipolar voltage. The battery is charged using the charging circuit, in various embodiments.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
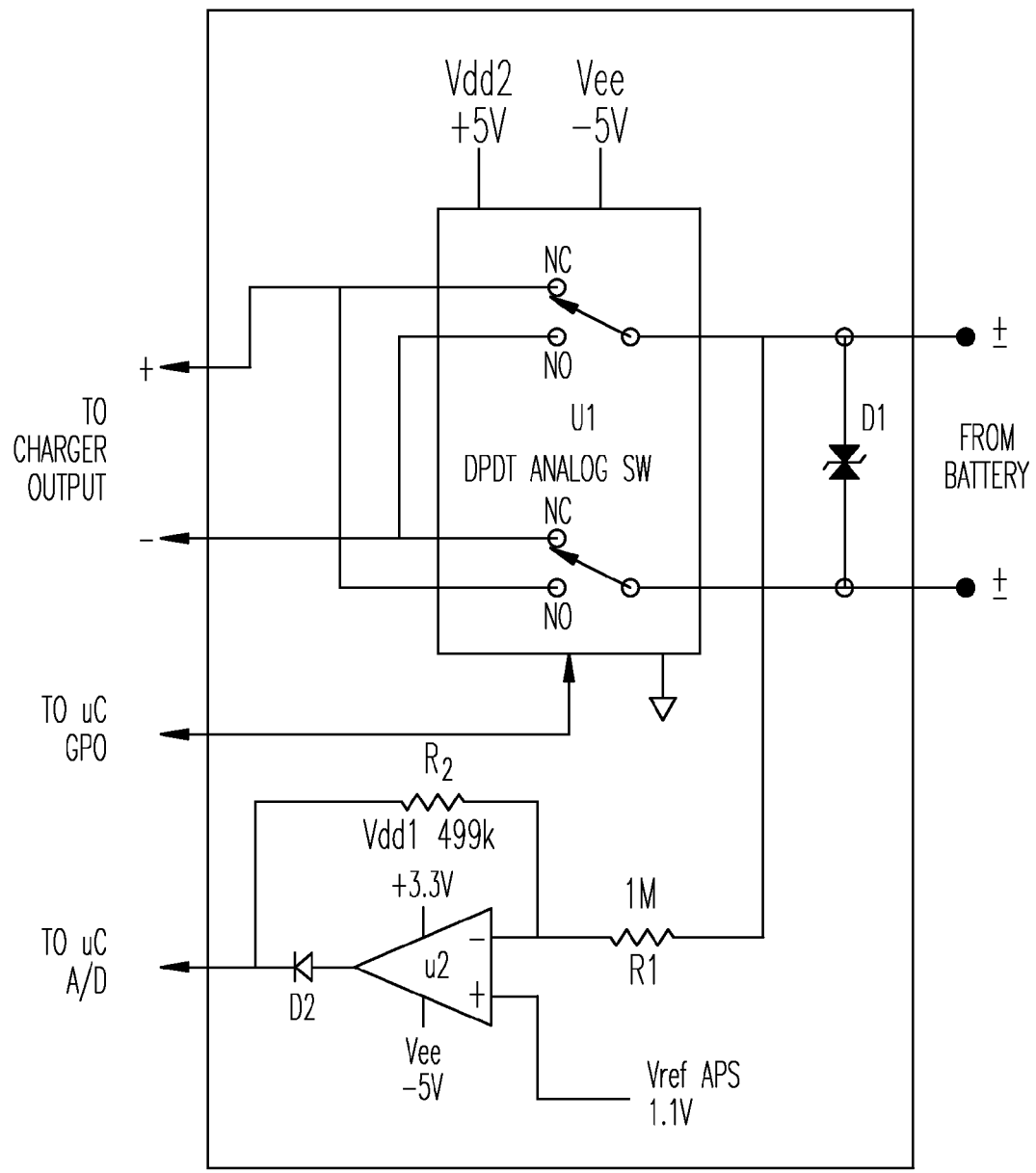
FIG. 1 illustrates a circuit diagram of an apparatus for detecting and switching battery polarity for a battery recharger, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Some electronic devices use rechargeable batteries that require periodic charging to maintain proper device performance. Battery rechargers typically require a battery to be inserted into the recharger in a single specific physical orientation to provide the correct polarity for recharging the battery. Existing solutions rely on either 1) mechanical features to restrict the user from inserting the battery the wrong way or 2) visible markings to instruct the user on proper insertion. However, these solutions are particularly troublesome in the case of relatively small battery cells. Mechanical features can be defeated by forceful insertion, which can prevent battery charging or even cause damage to the battery or charger. Visible markings are often difficult to see, particularly if small and not high in contrast, and are useless for people with visual impairments.

Disclosed herein, among other things, are apparatus and methods for detecting and automatically switching battery polarity in a battery charger. In various embodiments, a method includes grounding a first terminal of a battery inserted in a charger and sensing a bipolar voltage from a second terminal of the battery. The bipolar voltage is converted to a reduced unipolar voltage for sensing by an input to a microcontroller. A low resistance analog switch connects the battery to a charging circuit. The switch state of the analog switch is controlled using an output of the microcontroller, to present the proper battery polarity to the charging circuit based on the unipolar voltage. The battery is charged using the charging circuit, in various embodiments. Thus, the present subject matter provides for a battery to be successfully placed into a charging device in either of the two possible polarities. The circuitry of the present subject matter, used to detect and automatically switch battery polarity, is referred to herein as Auto Polarity Switching (APS) circuitry.

Hearing assistance devices, such as hearing aids, are used to assist patients suffering hearing loss by transmitting amplified sounds to ear canals. A hearing aid is typically worn in and/or around a patient's ear. Patients generally prefer that their hearing aids are minimally visible or invisible, which requires that the devices are of relatively small size. Hearing aids typically include a housing or shell with internal components such as a rechargeable battery. Thus, hearing aid batteries are relatively small and difficult to properly insert into a battery charger. In addition, typical hearing aid users include older adults that may have limited visual acuity and physical dexterity. Therefore, mechanical features and visible markings are often ineffective for assuring hearing aid batteries are properly placed in a charger. While the present subject matter is described for use with relatively small batteries, such as those used in hearing assistance devices, it is understood that their use in the description is intended to demonstrate the present subject matter, but not in a limited or exclusive or exhaustive sense. The present subject matter can be used with other types of batteries and battery chargers including, but not limited to, those in this document.

FIG. 1 illustrates a circuit diagram of an apparatus for detecting and switching battery polarity for a battery recharger, according to various embodiments of the present subject matter. According to various embodiments, a low resistance analog switch U1 connects the battery to the charging circuit. The switch state is controlled by a GPIO line from a microcontroller (uC), according to an embodiment. While the subject matter is described using a microcontroller, other types of processing or discrete logic can be used for the microcontroller function, including by not limited to a processor or microprocessor. In various embodiments, one line from the battery is initially temporarily normalized to ground to provide a reference for polarity sensing. The charging circuit's output is tri-stated to prevent damage from an initial momentary battery reversal, in various embodiments. In one embodiment, the charging circuitry and battery are fully protected from electrostatic discharge (ESD). In the depicted embodiment, D1 provides ESD protection and is not essential to APS circuit operation. In various embodiments, U2, D2, R1 & R2 form a precision diode circuit with voltage scaling that converts a bipolar voltage as referenced to ground, to a reduced voltage unipolar output for sensing by a microcontroller's A/D (analog/digital) input, as depicted in FIG. 2.

Figure 2:
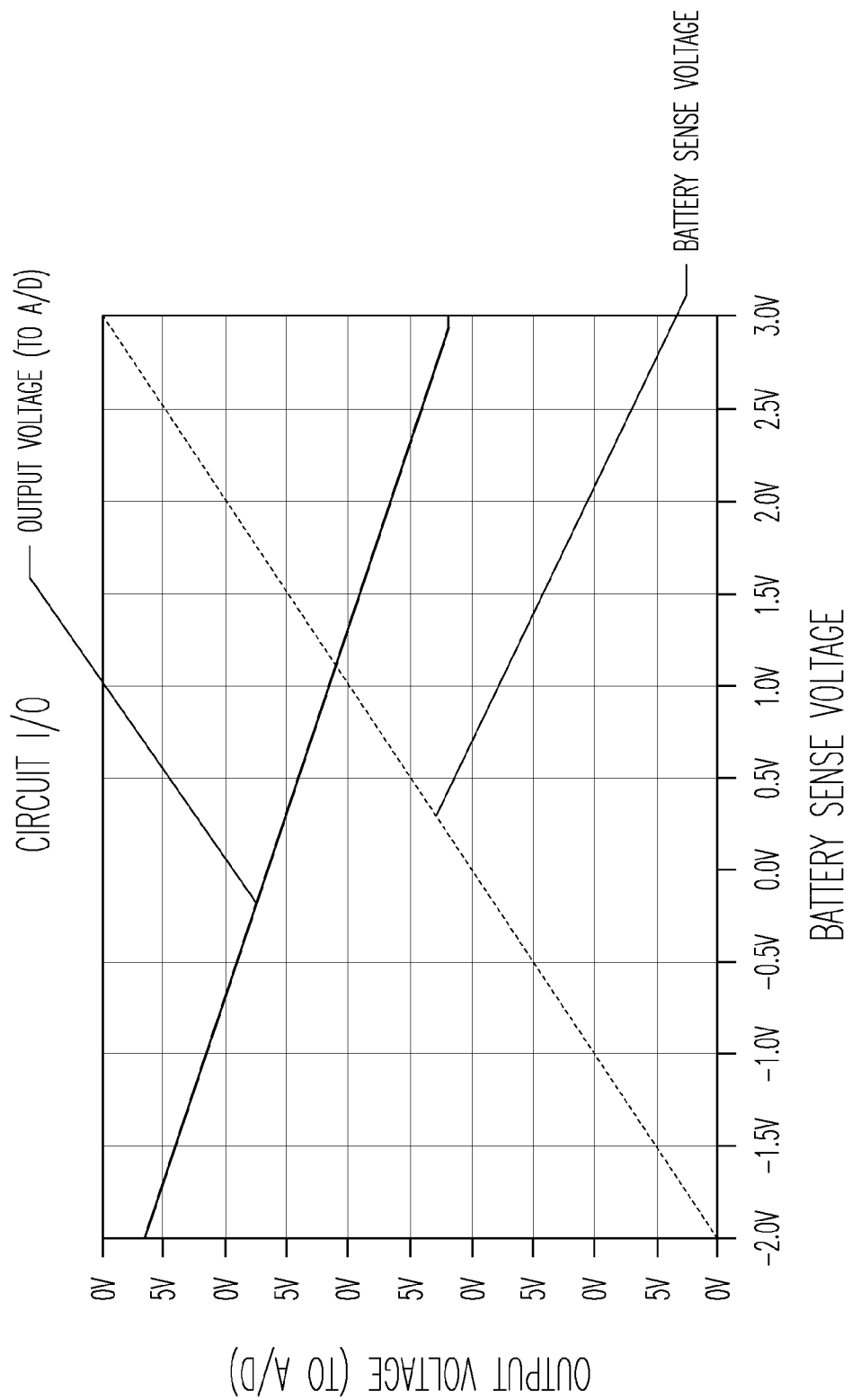
FIG. 2 illustrates a graphical depiction of a voltage sensed and output produced by an apparatus for detecting and switching battery polarity for a battery recharger, according to various embodiments of the present subject matter.

FIG. 2 illustrates a graphical depiction of a voltage sensed and output produced by an apparatus for detecting and switching battery polarity for a battery recharger, according to various embodiments of the present subject matter. In this example, the battery voltage is a maximum of 2 volts (V). Referenced to ground, the voltage will look like ±2V to U2's input. This is converted to a span of +1V to +3.1V at the output of U2, a voltage compatible with the A/D input, which may not fall below 0V or rise above the example 3.3V supply, in various embodiments. At the limits of the example, −2V from the battery produces a +3.1V output from U2. +2V equates to a voltage of +1V at U2's output. FIG. 2 is but one example of the present subject matter. The voltage range can be scaled to the requirements of the battery and the charging system's power supply.

Figure 3:
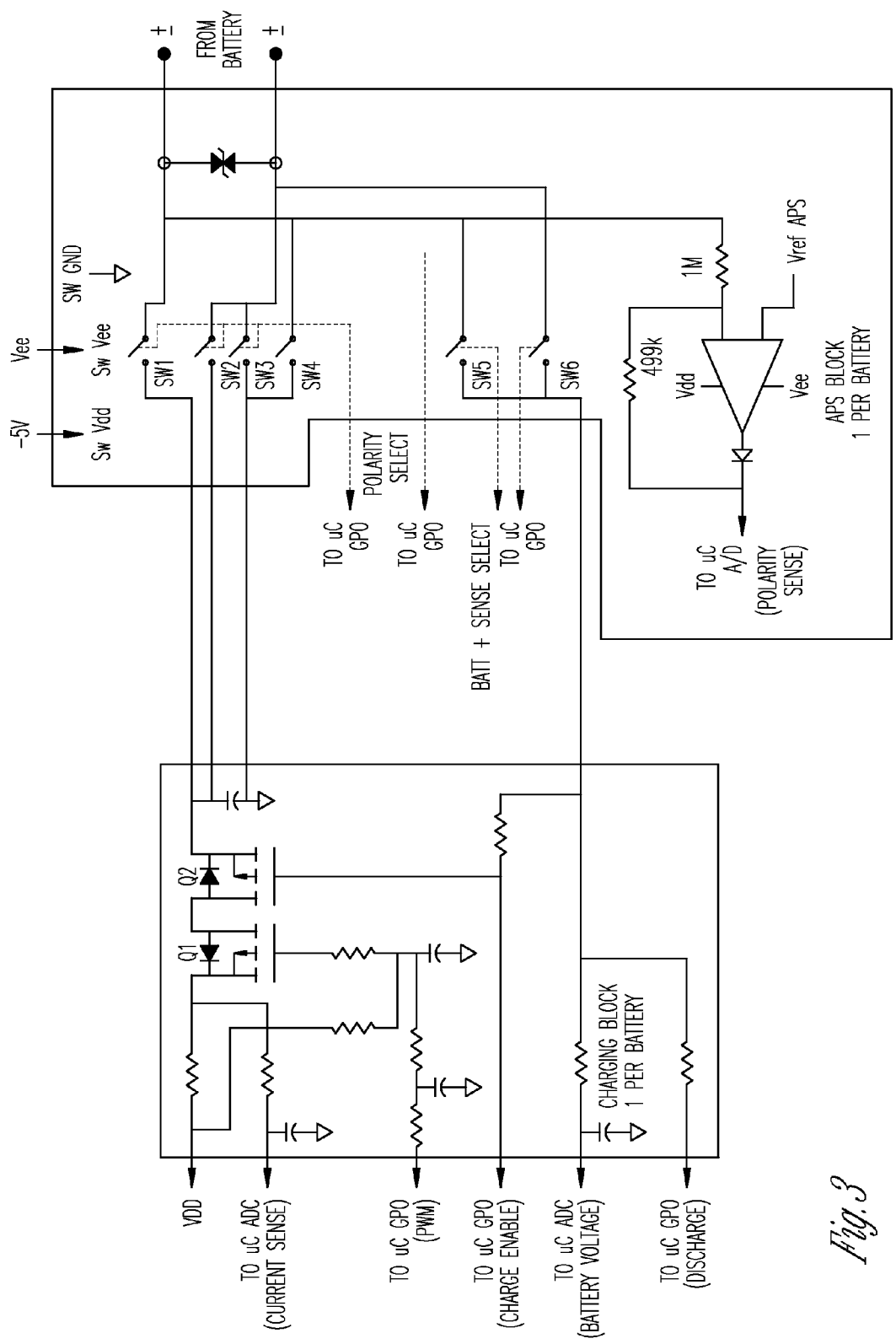
FIG. 3 illustrates a circuit diagram of an apparatus for detecting and switching battery polarity for a battery recharger, including a number of individual switches, according to various embodiments of the present subject matter.

Referring to FIG. 1, the battery to be charged is attached to the terminals "From Battery" in either polarity. The circuit of U2 level shifts and scales the battery voltage and presents that value to the microcontroller's A/D input, in an embodiment. The microcontroller interprets the A/D input and switches U1 to present the proper battery polarity to the charging circuitry. The microcontroller then brings the charging circuitry out of tri-state and begins the charging process, in various embodiments. In the embodiment of FIG. 3, this is done by turning on Q2, then modulating Q1 to control charge voltage and current. In one embodiment, the microcontroller uses the circuit's scaled sense voltage to determine if the battery has been removed. This feature can also be used at the end of charge when the charging circuitry has been turned off.

Figure 4:
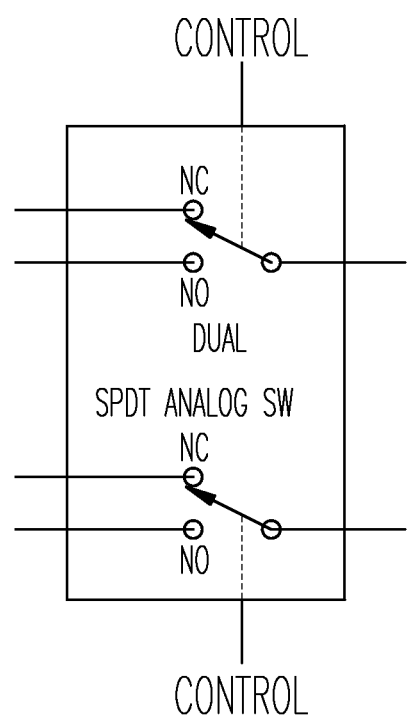
FIG. 4 illustrates single pole, double throw (SPDT) switch for use in an apparatus for detecting and switching battery polarity for a battery recharger, according to one embodiment of the present subject matter.

FIG. 3 illustrates a circuit diagram of an apparatus for detecting and switching battery polarity for a battery recharger, including a number of individual switches, according to various embodiments of the present subject matter. The present subject matter includes an APS circuitry block on the right hand portion of FIG. 3 includes the present subject matter. The charging circuitry block on the left hand portion of FIG. 3 is there for example, and one of skill in the art will appreciate that any number of charging circuits can be used with the APS circuitry of the present subject matter. The embodiment of FIG. 1 utilizes a double pole, double throw (DPDT switch). However, this portion of the APS circuitry, referred to as the current handling portion, can by implemented using a number of different types of components. In the embodiment of FIG. 4, the current handling portion of the circuit is shown to be a dual single pole, double throw (SPDT) switch, which would use an additional control line from the microcontroller. In the embodiment of FIG. 3, four individual switches, SW1-SW4 (or a quad single pole, single throw (or a quad SPST) switch) is used to replace the DPDT of FIG. 1, in which the microcontroller would handle additional switch logic. In the depicted embodiment, this would allow a fully-open tri-state condition to exist when the circuit is powered. In various embodiments, Q2, which isolates the charging path from anything that happens at the APS before polarity is determined, could be incorporated into the APS block.

According to various embodiments, the switching elements could be fabricated in a number of ways. In one embodiment, integrated circuit analog switches are used as shown, or in other combinations suitable to the number of batteries being charged. In another embodiment, solid state switching with discrete transistors is used for the APS block. In one embodiment, the discrete transistors include MOSFETs, but other transistors, such as JFETs, bipolar transistors, thyristors, etc., can be used without departing from the scope of this disclosure. In other embodiments, electromechanical relays may be used. Polarity switching decisions may be made without the use of a microcontroller, in various embodiments. In one embodiment, an analog window comparator at the output of operational amplifier (opamp) U2 could switch U1 to change polarity. However, compared to using a microcontroller, this implementation is not self-calibrating and would be more difficult to adapt to component drift and the wide range of input voltages experienced due to batteries at varying states of charge.

Various embodiments of the present subject matter compensate for switch characteristics. Most modern battery chemistries require precise monitoring of charge voltage at the battery, as inaccuracy can adversely affect the ultimate capacity (in Amp-Hrs) of the battery and potentially shorten the battery's service life. Adding a switch or switching means adds resistance to the charging circuit, in various embodiments. If voltage is measured within the charging block of FIG. 3, accuracy of the voltage measurement will suffer due to voltage drop across the switching means in the APS block. To compensate for this, a line called Voltage Sense is added, as shown in FIG. 3. This allows the charging controller to monitor voltage at the battery side of the commutating switches, avoiding the voltage drop that will occur as these switches pass current to charge the battery. In addition, SW5 and SW6 isolate the A/D input of the microcontroller from the battery until polarity detection has taken place. After polarity has been determined, the appropriate switch is selected to connect the A/D input to the positive terminal of the battery.

The APS circuit of FIG. 3 (or another embodiment of the APS circuit) is incorporated into an ASIC for a single chip solution, in various embodiments. The APS circuit or similar auto polarity sensing is incorporated into an ASIC that also contains the charging block circuitry, in an embodiment. The APS circuit, charging block, microcontroller and other components are integrated into an ASIC forming a single-chip charger with auto-polarity sense, in an embodiment. These "other components" include power supplies and references, ESD protection, temperature sensing, etc, in various embodiments. In one embodiment, the microcontroller is replaced by a hard-configured gate array and support components in the ASIC.

Figure 5A:
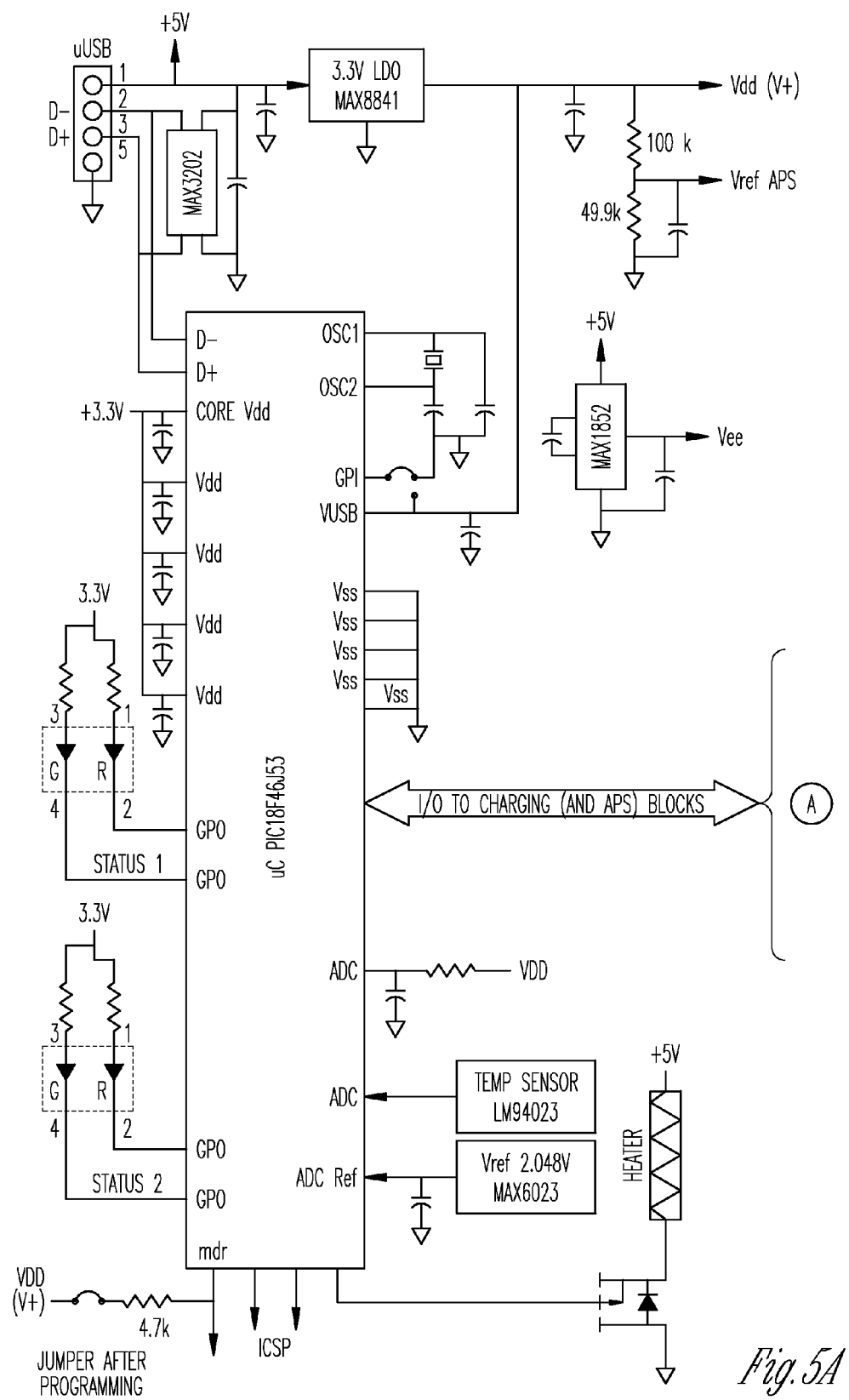
FIGS. 5A-5B illustrate a system including a microcontroller and an apparatus for detecting and switching battery polarity for a battery recharger, according to various embodiments of the present subject matter.
Figure 5B:
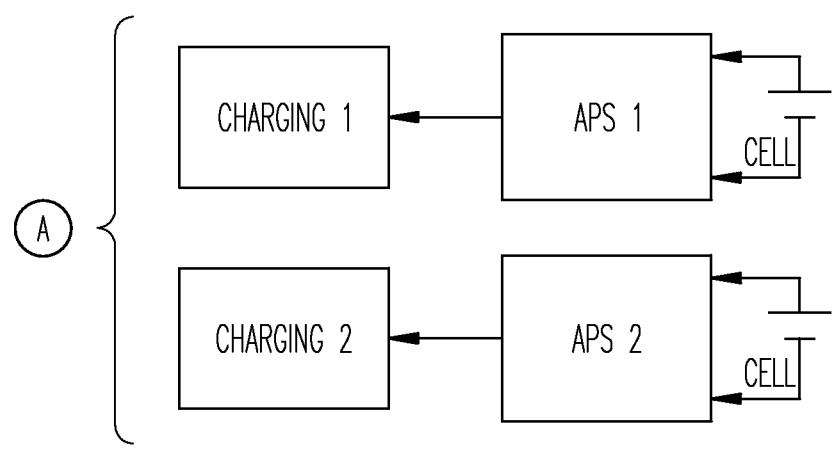

FIG. 4 illustrates single pole, double throw (SPDT) switch for use in an apparatus for detecting and switching battery polarity for a battery recharger, according to one embodiment of the present subject matter. FIGS. 5A-5B illustrate a system including a microcontroller and an apparatus for detecting and switching battery polarity for a battery recharger, according to various embodiments of the present subject matter.

The present subject matter senses the polarity of a battery placed into a charger and applies switching to allow charging to proceed. The present subject matter includes numerous advantages, including but not limited to: has a relatively small number of electronic components; uses a simple design that can use a wide range of components; can be adapted to use excess capacity of a microcontroller used to control charging; uses a relatively small amount of code; can be executed using discrete logic instead of using the microcontroller (if the microcontroller does not have a spare input/output, or for use with a dedicated off-the-shelf charging circuit); ease of use; and ease of ASIC integration if desired. The present subject matter also makes battery recharging easier for a user by removing obstacles, removing design constraints of providing legible markings and preventing improper mechanical battery insertion, and fully protects the charging circuit and battery.

While the present subject matter is described for use with relatively small batteries, such as button cell type batteries used in hearing assistance devices, it is understood that their use in the description is intended to demonstrate the present subject matter, but not in a limited or exclusive or exhaustive sense. The present subject matter can be used with other types of batteries and battery chargers including, but not limited to, those in this document. Larger batteries can be accommodated by scaling the size of the components used in the APS circuit, in various embodiments.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a hearing assistance device designed for use in the right ear or the left ear or both ears of the wearer.

The present subject matter is demonstrated for hearing assistance devices, including hearing aids, including but not limited to, behind-the-ear (BTE), in-the-ear (ITE), in-the-canal (ITC), receiver-in-canal (RIC), or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method, comprising:
   grounding a first terminal of a battery inserted in a charger;
   sensing a bipolar voltage from a second terminal of the battery;
   converting the bipolar voltage to a reduced unipolar voltage for sensing by an input to a microcontroller and converted to provide an indication of battery polarity;
   controlling a switch state of a low resistance analog switch using an output from the microcontroller,
   wherein the low resistance analog switch connects the battery to a charging circuit, and
   wherein the switch state is controlled to present the proper battery polarity to the charging circuit based on the unipolar voltage, and wherein the microcontroller is configured to use the unipolar voltage to determine if the battery has been removed or if charging is completed; and
   charging the battery using the charging circuit.

2. The method of claim 1, wherein converting the bipolar voltage to a reduced unipolar voltage includes using a precision diode circuit with voltage scaling.

3. The method of claim 1, wherein converting the bipolar voltage to a reduced unipolar voltage for sensing by an input to a microcontroller includes converting the bipolar voltage to a reduced unipolar voltage for sensing by an A/D (analog/digital) input to the microcontroller.

4. The method of claim 3, wherein converting the bipolar voltage to a reduced unipolar voltage includes converting the bipolar voltage to a range of 1.0V to 3.1V to be compatible with the A/D input.

5. The method of claim 1, wherein controlling a switch state of a low resistance analog switch using an output from the microcontroller includes controlling a switch state of a low resistance analog switch using a GPIO (general purpose input/output) line from the microcontroller.

6. The method of claim 1, wherein the microcontroller brings the charging circuitry out of tri-state to begin the charging process after the proper battery polarity is presented to the charging circuit.

7. The method of claim 1, wherein controlling a switch state of a low resistance analog switch includes controlling the switch state of a double pole, double throw (DPDT) switch.

8. The method of claim 1, wherein controlling a switch state of a low resistance analog switch includes controlling the switch state of a dual single pole, double throw (SPDT) switch.

9. The method of claim 1, further comprising protecting the charging circuitry and battery from electrostatic discharge (ESD).

10. The method of claim 1, wherein the charging circuit is tri-stated to prevent damage from an initial momentary battery reversal.

11. An apparatus for detecting and switching battery polarity for a battery charger, the apparatus comprising:
- a low resistance analog switch configured to connect a battery to the battery charger;
- circuitry configured to ground a first terminal of the battery when it is inserted into the battery charger, to sense a bipolar voltage from a second terminal of the battery, and to convert the bipolar voltage to a reduced unipolar voltage, and converted to provide an indication of battery polarity; and
- a processor configured to sense the reduced unipolar voltage using an input to the processor, and to control a state of the analog switch using an output from the processor, wherein the state of the switch presents proper battery polarity to the battery charger, and wherein the processor is configured to use the unipolar voltage to determine if the battery has been removed from the battery charger or if charging is completed.

12. The apparatus of claim 11, wherein the processor includes a microprocessor.

13. The apparatus of claim 11, wherein the processor includes a microcontroller.

14. The apparatus of claim 13, wherein the state of the analog switch is controlled by a GPIO line from the microcontroller.

15. The apparatus of claim 11, wherein the input to the processor includes an A/D input.

16. The apparatus of claim 15, wherein the reduced unipolar voltage includes a voltage compatible with the A/D input.

17. The apparatus of claim 11, wherein the analog switch includes a double pole, double throw (DPDT) switch.

18. The apparatus of claim 11, wherein the analog switch includes a dual single pole, double throw (SPDT) switch.

19. The apparatus of claim 11, wherein the analog switch includes discrete transistors.

20. The apparatus of claim 11, wherein the circuitry is incorporated into an ASIC that also contains circuitry for charging the battery.

* * * * *